United States Patent Office 3,651,102
Patented Mar. 21, 1972

3,651,102
PREPARATION OF DIESTERS
Myron Coopersmith, New York, N.Y., assignor to Esso
Research and Engineering Company
No Drawing. Filed May 1, 1967, Ser. No. 634,838
Int. Cl. A61k 7/14; C11c 3/00
U.S. Cl. 260—410.6
6 Claims

ABSTRACT OF THE DISCLOSURE

Glycol monoesters prepared by the reaction of hindered acids with alkylene oxides are converted to alkyl diesters and ether alkyl diesters in acid or base catalyzed reactions. The diesters are useful as emollients having good hydrolytic stability, and which do not suppress foam.

FIELD OF INVENTION

This invention relates to the preparation of novel diesters useful as emollients. More particularly, this invention relates to diesters derived from hindered acid glycol monoesters by acid or base catalyzed reactions. Still more particularly, this invention relates to the preparation of diesters having the generic formulae:

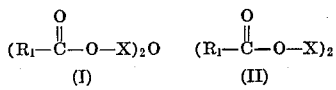

wherein I and II represent ether alkyl diesters and alkyl diesters, respectively, and wherein

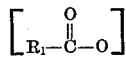

is a sterically hindered carboxyl radical and X is a divalent radical having the formula

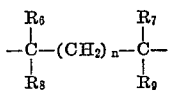

wherein $n$ is an integer from 0–8 and $R_6$, $R_7$, $R_8$, $R_9$ each can be hydrogen, $C_1$–$C_6$ alkyl, or $C_6$ aryl.

PRIOR ART

The prior art has recognized processes for preparing alkyl diesters and ether alkyl diesters wherein the carboxyl radical is unhindered. However, until the present, there has been no requirement for preparing such compounds wherein the carboxyl radical is sterically hindered. Consequently, the properties of such diesters have not been investigated. Accordingly, it has now been found that diesters of the type shown above, i.e., wherein the carboxyl radicals are hindered, cannot be easily prepared by known methods, and, moreover, that these diesters possess properties, particularly as emollients, which are quite unexpected in view of the known properties of diesters not possessing hindered carboxyl radicals.

In order to point out the particular advantages of the inventive process described herein, it is well to review some of the known methods by which ether alkyl diesters and alkyl diesters are prepared. For example, it was proposed to prepare ether alkyl diesters by the direct esterification of hindered acids with 2,2′-oxydialkanols, e.g., diethylene glycol. This method, however, requires relatively large amounts of a strong acid catalyst, e.g., sulfuric acid, in order to achieve reasonable conversions. Further, reaction periods are long, e.g., 17–18 hours for about 90% conversion, and black reaction products are obtained which remain yellow after distillation. To reduce the reaction period, e.g., to about 3–5 hours, a higher temperature can be used, but this procedure results in a broad product distribution with little selectivity to the desired product. It was also proposed to use mild acid catalysts, e.g., p-toluene-sulfonic acid, to reduce the severity of the reaction. However, this technique is similarly unsatisfactory since it results in long reaction periods and low conversions. Increasing the temperature to reduce reaction periods does not lead to any significant increase in conversion. Similarly, direct routes to the alkyl diesters, e.g. diester of ethylene glycol with hindered acids, are not practical since relatively large amounts of strong acid catalysts are required for the esterification, the first step being the formation of the half ester. This method ultimately leads to a broad product distribution containing diesters of ethylene glycol, diethylene glycol, triethylene glycol, and considerable amounts of higher boiling unidentifiable products.

However, it has now been discovered that these novel diesters can be prepared in excellent selectivity, with exceedingly high conversions, and in relatively short reaction times. Furthermore, the products can now be prepared in a water white color, a feature which is difficult, if not entirely impossible, to obtain when using methods known to the prior art. Additionally, these novel diesters can be utilized as superior emollients since the compounds possess excellent hydrolytic stability and an ability to allow full foam formation where foaming is desirable, as well as the ability to soften the skin.

SUMMARY OF THE INVENTION

In accordance with this invention, therefore, diesters having the generic formulae:

wherein

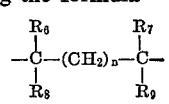

is a sterically hindered carboxyl radical and X is a divalent radical having the formula

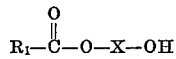

wherein $n$ and $R_6$, $R_7$, $R_8$, $R_9$ are as described above and may be prepared by the conversion of hindered acid glycol monoesters of the generic formula:

$$R_1-\overset{O}{\underset{\|}{C}}-O-X-OH$$

the conversion to the diester being effected by contacting the glycol monoester with an esterification catalyst under esterification reaction conditions. Formation of the ether alkyl diester (through etherification) is promoted by acid catalysis while alkyl diester formation (through self-ester exchange) is promoted by both acid or basic catalysis.

The ease with which the conversion takes place is particularly unexpected with regard to the product of Formula I, an ether alkyl diester. Etherification reactions to form ethers are not generally expected to proceed so smoothly. For example, the preparation of ethers from simple alcohols involves dehydration with a strong acid catalyst and the resulting product mix contains large amounts of olefins and aldehydes in addition to the ethers. Use of a mild acid catalyst is also unsatifactory in that low conversions, e.g., 15–20% in about 4 hours followed by essentially no reaction, are obtained and olefin formation still occurs. However, by utilizing the hindered acid glycol monoester as the starting material relatively pure products can be obtained.

Depending upon the particular catalyst employed, the conversion of the glycol monoester will be highly selective to either the ether alkyl diester or the alkyl diester. Nevertheless, both compounds possess the important properties of hydrolytic stability and nonfoam depressing characteristics. Thus, while it is now disclosed herein that acid or basic catalysis will convert the glycol monoester to valuable diesters, the particular diester prepared, i.e., ether alkyl diester or alkyl diester, is not as important as knowing that the reaction product is a superior emollient. Regardless of the product, however, conversion of the glycol monoester is at least about 90%, preferably at least about 95%, and selectivity to the desired product is at least about 85%, preferably at least about 90%.

The novel diesters prepared by this process have several properties not possessed by similar diesters which do not contain the hindered carboxyl radical. Among these advantageous properties is the ability of these new compounds to act as hydrolytically stable emollients. Also, in applications where foaming is desirable, e.g., shampoos, bar soaps, these new diesters do not act as foam depressants, a surprising property in view of the fact that emollients are generally known to suppress foam formation. In actuality, the novel compounds of this invention are capable of acting as skin softening agents, i.e., emollients, while not affecting foam formation and in some cases improving the ability of the formulation to develop and maintain foam. Further, products, such as shampoos or bar soaps, are normally formulated to be either acidic or basic. Diesters, ether alkyl or alkyl, that do not contain the hindered carboxyl radical would be expected to hydrolyze readily under such conditions. However, the novel compounds of this invention do not appreciably hydrolyze in either basic or acidic media, consequently allowing a formulator far greater latitude in selecting the components for a particular formulation.

The high selectivity with which these novel compounds are formed is also believed to be due to the presence of the sterically hindered carboxyl radical. For example, the etherification of an unhindered or straight chain acid glycol monoester would normally lead to the formation of substantial amounts of free glycol and glycol diesters by the well-known ester exchange reaction. Nevertheless, by utilizing a hindered acid glycol monoester, the amount of side reaction is markedly reduced and high selectivity to ether alkyl diester is achieved. Thus, the novel products described herein can be prepared in yields heretofore not thought possible by the prior art.

From the foregoing discussion, it is apparent that the use of a hindered acid glycol monoester is essential to achieving the ends of this invention. The use of unhindered or straight chain acid glycol monoesters leads to a product mix containing a variety of products, therefore effectively reducing the available yield of the diesters and producing a product of inferior properties.

The hindered acid glycol monoesters applicable to this invention can be represented by the generic formula:

$$R_1-\overset{O}{\underset{\|}{C}}-O-X-OH, \text{ wherein } [R_1-\overset{O}{\underset{\|}{C}}-O]$$

is a sterically hindered carboxyl radical and $R_1$ is a $C_4-C_{65}$ aliphatic radical, preferably a $C_5-C_{20}$ aliphatic radical, and X is a divalent radical having the formula

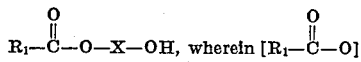

wherein $n$ is 0 to 8 and $R_6$, $R_7$, $R_8$ and $R_9$ are each selected from the group consisting of hydrogen, $C_1-C_6$ alkyl, and $C_6$ aryl, preferably, however, when forming esters of Formula I, above, $n$ is 0 to 1, and still more preferably X is the same for Formulae I and II and $n$ is 0 to 1 and $R_6$, $R_7$, $R_8$ and $R_9$ are each hydrogen. A preferred method for the preparation of these compounds is disclosed in copending application Ser. No. 482,267, filed Aug. 24, 1965. Briefly stated, the process described therein involves the reaction of a sterically hindered acid with alkylene oxides under base catalyzed reaction conditions. Alkylene oxides, such as ethylene oxide, propylene oxide, butylene oxide, glycidyl ethers, styrene oxide, and the like may be employed. The preferred materials for reaction with the hindered acid when preparing the glycol monoester, and the esters of Formula I are to be produced, are oxiranes and oxitanes, e.g., ethylene oxide, 1,2-propylene oxide, 1,3-propylene oxide, trimethylene oxide, while the preferred materials for reaction with the hindered acid when preparing the glycol monoester and the esters of Formula II are to be produced, are oxitanes, oxiranes, glycols, e.g., 1,3-propane diol, 1,6-hexane diol, 1,2-propane diol, etc. and alkyl or aryl substituted derivatives of the foregoing. The acids utilized are those wherein the carboxyl group is sterically hindered or blocked. A discussion of steric hindrance may be found in Newman, Steric Effects in Organic Chemistry, 1956, pp. 204-207. Hindered acids are also described in U.S. Pats. 3,256,321 and 3,210,804. Generally, however, steric hindrance results from branching on the alpha-, beta-, or gamma-carbon atoms of the acid. Preferred acids are those possessing a carboxyl group attached to a secondary or tertiary carbon atom, particularly those wherein the carboxyl group is attached to a tertiary carbon atom. Carboxylic acids wherein the carboxyl group is attached to a tertiary carbon atom are often referred to as neo-acids. (Neo is used to denote a carbon atom that is bonded to four other carbon atoms, e.g., as in neopentane, also known as 2,2-dimethylpropane.) The hindered acids utilized in preparing the glycol monoesters are also generally referred to as "Koch" type acids, the preparation and molecular structure of which are well known to those skilled in the art. For example, a neodecanoic acid refers to a $C_{10}$ acid with a tertiary carboxyl group.

Consequently, $R_1$ is preferably further defined by the generic formula:

wherein $R_3$, $R_4$ and $R_5$ are each $C_1-C_{20}$ hydrocarbyl radicals, $R_3$ is preferably a $C_5-C_{13}$ alkyl radical, and $R_4$ and $R_5$ are each preferably $C_1-C_4$ alkyl radicals. Some typical examples of neoacids are: 2,2-dimethyl-1-butanoic acid, 2,2-dimethyl-1-pentanoic acid and this homologous series up to about 2,2-dimethyl-1-eicosanoic acid, 2-methyl-2-ethyl-1-$C_4$-$C_{20}$ monocarboxylic acid, 2-methyl-2-propyl-1-$C_5$-$C_{20}$ monocarboxylic acid, 2-methyl-2-amyl-1-$C_7$-$C_{20}$ monocarboxylic acid, 2,2-diethyl-1-$C_4$-$C_{20}$ monocarboxylic acid, 2-ethyl-2-propyl-1-$C_5$-$C_{20}$ monocarboxylic acid, 2-ethyl-2-butyl-1-$C_6$-$C_{20}$ monocarboxylic acid, 2-ethyl-2-amyl-1-$C_7$-$C_{20}$ monocarboxylic acid, 2,2-dipropyl-1-$C_5$-$C_{20}$ monocarboxylic acid, 2-propyl-2-btuyl-1-$C_6$-$C_{20}$ monocarboxylic acid, 2-propyl-2-amyl-1-$C_7$-$C_{20}$ monocarboxylic acid, 2,2-dibutyl-1-$C_6$-$C_{20}$ monocarboxylic acid, 2,2-diamyl-1-$C_7$-$C_{20}$ monocarboxylic acid, 2-butyl-2-amyl-1-$C_7$-$C_{20}$ monocarboxylic acid, 2-hexyl-2-methyl decanoic acid, trimethylacetic acid, dimethylcyclohexylacetic acid, dimethylphenylacetic acid, and the like. Thus, the most preferred monoesters will have the generic formula:

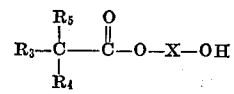

wherein $R_3$, $R_4$, $R_5$ and X are as previously described.

While the procedure disclosed in the above-mentioned copending application is the preferred method for preparing the hindered acid glycol monoesters, this invention is also applicable to hindered acid glycol monoesters prepared in any manner. Thus, for example, hindered acid glycol monoesters can be prepared by the direct esterification of hindered acids with excess glycol, i.e., diols such as ethylene glycol, propylene glycols, butane diols, etc. Other methods for preparing the hindered acid glycol monoester are: forming the silver salt of the hindered acid and reacting with a halohydrin, e.g., ethylene chlorohydrin, 1-chloro-4-hydroxy butane; forming the hindered acid chloride and reacting with a diol in the presence of an organic base, e.g., pyridine; reacting the hindered acid with alkylene oxides in the presence of specific catalysts, e.g., quaternary ammonium salts.

In order to form the novel diester compounds of the present invention, the monoester is contacted with an acid or base catalyst under esterification reaction conditions. These conditions are described herein below. Reaction temperatures may range from about 150 to 250° C., preferably 195 to 215° C. Temperatures below 150° C., e.g., 120° C., may also be used but the reaction will be relatively slow. Above about 250° C. by-product formation will increase and further purification would be generally required to isolate the desired product in acceptable purity levels. Pressures are not critical and may vary widely, e.g., from 1–30 atmospheres, preferably 1–10 atmospheres. The catalyst concentration is similarly not critical and the catalyst is employed in amounts normally known as catalytic amounts. Nevertheless, catalyst concentration is generally about 0.1 to 5.0 wt. percent based on monoester, preferably 1 to 2 wt. percent.

Reaction periods are not critical and the reaction is normally conducted for a period of time sufficient to effect the desired conversion and selectivity, e.g., ½ hour to 15 hours. However, excessive reaction periods will generally lead to an increase in by-products at the expense of the desired diesters. One skilled in the art will easily determine the optimum considerations for a particular reaction.

The reaction is normally carried out in the presence of an entrainer, although the entrainer is not wholly essential to conducting the reaction. Entrainers serve to eliminate any water formed during the reaction, e.g., in the dimerization to ether alkyl diesters, and, therefore, to prevent hydrolysis of the reactants and products. When water is not formed as a reaction product, the same materials may be employed as solvents or diluents for the reaction. Illustrative of the materials that can be employed as entraining agents and/or solvents or diluents are: $C_5-C_{20}$ paraffins, e.g., heptane, octane, nonane, etc.; and $C_6-C_{20}$ aromatics, e.g., benzene, toluene, xylene, etc. When employed, these materials normally comprise about 3–90 wt. percent of the reaction mixture, preferably 5 to 20 wt. percent.

The catalysts that can be employed in this invention are generally characterized as esterification catalysts, i.e., those catalysts, acid or base, that will promote esterification reactions. Acid catalysts can be used to promote the formation of the ether alkyl diester or the alkyl diester depending upon the type of catalyst employed. Nevertheless, a major advantage of this process is that strong or mild acid catalysts may be employed without significant detriment to yield or color of the product. When acids are utilized as catalysts, however, it is preferred to utilize mild acids, i.e., characterized by weakly or intermediately ionizable hydrogens as distinguished from the strongly ionizable hydrogens of strong acids. These mild acid catalysts can be further described as organic and inorganic acids and salts thereof with ionization constants ranging from about $1 \times 10^{-3}$ to about $1 \times 10^{-10}$. Typical examples of these mild acid catalysts are p-toluenesulfonic acid, mixed sulfonic acid, e.g., benzene sulfonic acid and lower alkene sulfonic acids, sodium bisulfate, stannous oxalate, zinc chloride, zinc acetate, etc., while strong acids are generally exemplified by the mineral acids, e.g., sulfuric, nitric, hydrochloric, phosphoric, etc., as well as acids as trichloroacetic acid and trifluoroacetic anhydride. However, it has also been found that other acidic type substances are also quite useful, for example, acid impregnated kieselguhr, e.g., 100–110% phosphoric acid on kieselguhr; acid activated clay, e.g., montmorillonite and halloysite, such as Superfiltrol; acid ion exchange resins, e.g., sulfonic acid resins (Dowex 50–X–8, Amberlyst 15); acid activated or impregnated silica-alumina cogels as used in the cracking of gas oils to gasoline, such as Davison DA–1 and Cyanamid CCC catalysts; acidic or acid impregnated natural and synthetic zeolites. Particularly preferred acid catalysts are sodium bisulfate, stannous oxalate, sulfuric acid and acidic solid catalysts.

As previously mentioned, the particular acid catalyst utilized will determine whether the ether alkyl diester or alkyl diester will be formed. While it is not entirely clear as to the reasons for this variation in product selectivity, ether alkyl diesters are generally believerd to be promoted, in part, by carbonium ion formation. Acid catalysts that promote carbonium ion formation are generally described as Bronsted acids, i.e., proton donors. To be acidic in the Bronsted sense, a molecule must, of course, contain hydrogen. These acids are typified by the mineral acids, p-toluene sulfonic acid, organic acids, such as acetic acid, trichloroacetic acid, etc. However, it has also been found that acidic type solids also promote formation of ether alkyl diesters. The alkyl diesters, however, are generally believed to be promoted by Lewis acids, i.e., electron pair acceptors, such as stannous oxalate, boron trifluoride, aluminum trichloride, Friedel-Crafts catalysts generally, e.g., zinc, titanium, ferric, stannic, antimony, niobium, tellurium, bismuth, mercuric, tantalum halides, etc. However, since the selectivity to either product is not absolute, one skilled in the art will readily appreciate that when etherification is the major reaction some self-ester exchange will occur and, similarly, when self-ester exchange is the major reaction some etherification will also occur.

Alkyl diesters are also promoted by basic catalysts as well, such as alkali metal hydroxides, e.g., NaOH, alkaline earth metal hydroxides, salts of strong bases, sodium metal, sodium alkoxides, e.g., sodium methylate, amines, etc.

PREFERRED EMBODIMENT

In a preferred embodiment of this invention, acid catalysts are employed to promote diester formation. Thus, regardless of the product formed the chief by-product will be the other diester under acid catalysis. Thus, for example, sulfuric acid promotes the formation of ether alkyl diesters in high yields, the chief by-product being the alkyl diester. Similarly, stannous oxalate promotes the selective formation of alkyl diesters, the chief by-product being the ether alkyl diester. Basic catalysts, on the other hand, will normally form a glycol, e.g., ethylene glycol, as the chief by-product. Thus, the use of acid catalysts leads to a reaction product which requires only minor working up, a procedure well known to those skilled in the art, e.g., neutralization followed by water wash, stripping to remove entrainers and light ends, and distillation or contact with an absorbent to give the best color properties.

The novel diesters of this invention find great utility as emollients in skin treating formulations. These formulations include skin cleansing formulations, such as cleansing creams, shampoos, soaps, etc., as well as shaving creams, shaving lotions, e.g., pre- and after-shave, bubble baths, light duty liquid detergents, quick breaking aerosol foams, etc. Thus, such formulations will employ, in addition to the emollient, emulsifying agents, water, perfumes, oils, aerosols, preservatives, germicides and the like. Generally, the common features of these skin treating formulations are emollients and water. Depending upon the use for which the formulation is designed, the emollient may comprise about 0.1 to about 60 wt. percent of the formulation, preferably about 1 to 35 wt. percent. Those skilled in the art will be quite able to adjust the components of the formulation for any desired purpose.

Having now described this invention, it will be further illustrated by reference to the following examples. However, no limitations other than those in the several claims appended hereto are to be implied since modifications of these examples will be apparent to those skilled in the art.

EXAMPLE 1

Preparation of diethylene glycol di-neo-decanoate (etherification of ethylene glycol mono-neo-decanoate)

To a one-liter, four-necked reaction flask fitted with a stirrer, a thermometer, a syringe sampling device, and a reuflx condenser joined to a Dean-Stark water separator are added 648 grams (3.0 moles) ethylene glycol mono-neo-decanoate, 6.5 grams para-toluene sulfonic acid, and 100 grams xylene as entrainer. The reaction vessel is heated to 160–200° C. and maintained at this temperature for 5 hours. Water is removed as the reaction proceeds and samples are taken every hour for gas chromatography analysis. The mixture is then cooled to room temperature and washed with 10% sodium hydroxide solution and with water until neutral. The resulting product is stripped under vacuum to remove dissolved water, xylene entrainer, and unconverted glycol monoester. It is then flash distilled at 183–184° C. and 1 mm. Hg pressure. The ether alkyl diester thus formed has a final color of 10 Pt-Co which is an excellent color for such compounds. Selectivity and conversion to product under varying conditions of temperature are shown in Tables I–III.

Gas chromatography conditions

Model: F & M 500
Column: 10% silicone rubber/chrom
Length: 2'
Temperature: Start 100° C.—Hold 325° C.
Temperature program: 5.6 C./min.
Attenuation: ×4
Sample size: 5 ul.

In a similar manner as described above, an acidic type solid [1] was utilized as the catalyst and the crude reaction product obtained was almost water white (Pt-Co of 25–30). This illustrates the effectiveness of acid catalysts in producing products with excellent color characteristics.

TABLE I.—DIMERIZATION OF ETHYLENE GLYCOL MONO-NEO-DECANOATE AT 160° C.

[1 wt. percent p-toluene sulfonic acid as catalyst]

| Reaction time in hours | Conversion (wt. percent) [1] | Product selectivity (wt. percent) [1] | | |
|---|---|---|---|---|
| | | Diester of ethylene glycol | Diester of diethylene glycol | Diester o triethylene glycol |
| 1 | 43.1 | 5.3 | 93.0 | 1.7 |
| 2 | 47.9 | 8.3 | 89.1 | 2.6 |
| 3 | 63.1 | 10.2 | 84.5 | 5.3 |
| 4 | 76.8 | 10.8 | 82.3 | 6.9 |
| 5 | 84.8 | 12.2 | 81.2 | 6.6 |

[1] Determined by gas chromatography analysis.

TABLE II.—DIMERIZATION OF ETHYLENE GLYCOL MONO-NEO-DECANOATE AT 180° C.

[1 wt. percent p-toluene sulfonic acid as catalyst]

| Reaction time in hours | Conversion (wt. percent) [1] | Product selectivity (wt. percent) [1] | | |
|---|---|---|---|---|
| | | Diester of ethylene glycol | Diester of diethylene glycol | Diester of triethylene glycol |
| 1 | 35.2 | 8.0 | 88.6 | 3.4 |
| 2 | 56.8 | 8.1 | 87.6 | 4.3 |
| 3 | 75.8 | 7.7 | 86.3 | 6.0 |
| 4 | 88.3 | 8.8 | 84.6 | 6.6 |
| 5 | 93.0 | 7.5 | 85.5 | 7.0 |

[1] Determined by gas chromatography analysis.

[1] Filtrol Grade 40 obtained from Filtrol Corp. of America, California.

Product analysis:                                         Percent
  SiO₂ _____ 71
  Al₂O₃ _____ 17
  Fe₂O₃ _____ 3.5
  MgO _____ 3
  CaO _____ 2.5

TABLE III.—DIMERIZATION OF ETHYLENE GLYCOL MONO-NEO-DECANOATE AT 200° C.

[1 wt. percent p.toluene sulfonic acid as catalyst]

| Reaction time in hours | Conversion (wt. percent) [1,2] | Product selectivity (wt. percent) [1] | | |
|---|---|---|---|---|
| | | Diester of ethylene glycol | Diester of diethylene glycol | Diester of triethylene glycol |
| 1 | 40.6 | 4.4 | 93.3 | 2.3 |
| 2 | 56.1 | 4.7 | 91.4 | 3.9 |
| 3 | 76.2 | 5.2 | 91.6 | 4.2 |
| 4 | 92.0 | 6.0 | 88.9 | 5.1 |
| 5 | 96.4 | 7.3 | 86.7 | 6.0 |

[1] Determined by gas chromatography analysis.
[2] Less than 3 wt. percent conversion observed after 5 hours at 200° C. when catalyst omitted.

EXAMPLE 2

Preparation of diethylene glycol di-neo-decanoate (direct esterification of diethylene glycol with neo-decanoic acid)

The same apparatus as described above is employed. The reaction mixture contains 340 grams (2.0 moles) neo-decanoic acid, 116 grams (1.1 moles) diethylene glycol, 4.6 grams concentrated sulfuric acid and 150 ml. toluene as entrainer. The temperature is maintained at 145–150° C. and reaction is followed by titration of residual acid. After 17 hours a 90% conversion to product is obtained. Washing and distillation as decsribed above results in a final product of Gardner color 1–2. Thus, it is clear that direct esterification is not a feasible process for the preparation of these ether alkyl diesters, particularly when compared to the results shown in Tables I–III.

EXAMPLE 3

Hydrolysis of cosmetic oils with base

The hydrolyzing solution consists of 0.25 N NaOH in 10% aqueous ethylene glycol monoethyl ether. Flasks are kept at either room temperature or 50° C., and aliquots are removed at various times for titration to determine the extent of hydrolysis. Data is summarized in Tables IV–V

EXAMPLE 4

Hydrolysis of cosmetic oils with acid

The hydrolyzing solution consists of 0.25 N HCl in 10% aqueous acetone. Samples are removed and titrated periodically as above. Data is summarized in Table VI.

TABLE IV.—BASE HYDROLYSIS OF COSMETIC OILS AT 50° C.

| | Weight percent hydrolysis | | |
|---|---|---|---|
| Time, hours | Diethylene glycol di-neo-decanoate | Isopropyl myristate | Propylene glycol dipelargonate |
| 0.2 | | | 53.3 |
| 0.3 | | | 85.3 |
| 0.5 | | 51.8 | 95.2 |
| 0.7 | | | 99.5 |
| 1.0 | 5.0 | 83.4 | |
| 2.0 | 7.4 | 100.2 | |
| 5.0 | 12.4 | | |
| 22.0 | 27.3 | | |
| 46.0 | 36.4 | | |

TABLE V.—BASE HYDROLYSIS OF COSMETIC OILS AT 25° C.

| | Weight percent hydrolysis | | |
|---|---|---|---|
| Time, hours | Diethylene glycol di-neo-decanoate | Isopropyl myristate | Propylene glycol dipelargonate |
| 1.0 | | 16.6 | 71.5 |
| 2.0 | | 34.4 | 92.3 |
| 3.0 | | | 100.4 |
| 28.0 | 4.1 | | |
| 70.0 | | 17.2 | |
| 190.0 | | 27.0 | |

TABLE VI.—ACID HYDROLYSIS OF COSMETIC OILS AT 50° C.

| Time, hours | Weight percent hydrolysis | | |
|---|---|---|---|
| | Diethylene glycol di-neo-decanoate | Isopropyl myristate | Propylene glycol dipelargonate |
| 5 | 2.0 | 15.9 | 24.3 |
| 24 | 3.6 | 54.9 | 79.1 |
| 47 | 7.2 | 83.3 | 98.8 |
| 72 | 10.4 | 98.0 | |
| 168 | 18.1 | | |

It is clear from the tables that the sterically hindered carboxyl radicals of diethylene glycol di-neo-decanoate markedly reduces hydrolysis from occurring under both basic and acidic conditions as compared to materials commonly used in the cosmetic industry.

EXAMPLE 5

The emollients of the present invention show superior foam stability in comparison to other emollients shown below in a shampoo formulation.

Formulation: Wt. percent
- Triethanolamine lauryl sulfate _____ 12.0
- Lauric diethanolamine _____ 4.0
- Triethanolamine _____ 1.7
- Oleic acid, USP _____ 3.3
- Propylene glycol _____ 5.0
- Emollient _____ 5.0
- Water _____ 69.0

100.0

Test procedure

Add 1 gram of the formulation to 300 ml. of water in a one-liter graduated cylinder. Shake vigorously for 30 seconds and observe (static conditions). Record foam height at intervals. Evaluation data under static conditions is given in Table VII.

tions were continually agitated to simulate performance in use. The formulation shown in Example 5 was used with different emollients shown below.

Test procedure

In a two-liter graduated cylinder was placed 600 ml. of distilled water and 2 grams of formulation. Each cylinder was agitated continuously in an up-and-down manner by a ¼″ plunger fitted on bottom with a 2″ diameter stainless steel wire mesh screen. Evaluation under these dynamic conditions is given in Table VIII.

TABLE VIII.—SHAMPOO EVALUATION USING DYNAMIC CONDITIONS

| Emollient | Clarity of formulation after 24 hours | Foam height (cc.) [1] | | | | | | |
|---|---|---|---|---|---|---|---|---|
| | | 1 min. | 5 min. | 10 min. | 15 min. | 20 min. | 30 min. | 40 min. |
| No oil | Clear | 680 | 790 | 870 | 910 | 930 | 840 | 660 |
| Diethylene glycol [2] di-neo-decanoate | do | 690 | 770 | 830 | 900 | 920 | 950 | 900 |
| Diethylene glycol di-decanoate | do | 660 | 740 | 800 | 820 | 860 | 880 | 840 |
| Propylene glycol di-pelargonate | Split into 2 layers | 680 | 780 | 820 | 840 | 840 | 840 | 760 |
| Hexadecyl alcohol | do | 640 | 700 | 700 | 680 | 680 | 640 | 640 |
| Isopropyl myristate | Clear | 680 | 780 | 840 | 860 | 860 | 820 | 760 |

[1] Foam height is given as the total volume of formulation and foam head in a two-liter graduated cylinder.
[2] Product mix contains: see Table III, item 5.

It is clear from the table that emollients of the present invention do not depress foam under dynamic conditions when compared to a formulation containing no emollient, and actually help stabilize foam for considerable periods of time (such stability is particularly desirable in bubble bath formulations). In addition, it is clear that the novel compounds of this invention are superior in maintaining and stabilizing foam when compared to similar structures of the same molecular weight differing only in the absence of the desired sterically hindered carboxyl radicals. It is also evident that the novel compounds of this invention are superior in maintaining and stabilizing foam when compared to commercially available emollients.

EXAMPLE 7

The following example illustrates the application of the emollients of the present invention in an aerosol shaving cream.

| Formulation | Wt. percent | | |
|---|---|---|---|
| | A | B | C |
| Steric acid | 9.0 | 9.0 | 9.0 |
| Coconut fatty acid | 1.5 | 1.5 | 1.5 |
| Triethanolamine | 5.0 | 5.0 | 5.0 |
| Water | 82.5 | 82.5 | 82.5 |
| Diethylene glycol di-neo-decanoate | 2.0 | | |
| Ethylene glycol di-neo-decanoate | | 2.0 | 2.0 |
| Hexadecyl alcohol | | | |

TABLE VII.—SHAMPOO EVALUATION USING STATIC CONDITIONS

| Emollient | Clarity of formulation after 24 hours | Foam height (cc.) [1] | | | | |
|---|---|---|---|---|---|---|
| | | 1 min. | 5 min. | 10 min. | 15 min. | 20 min. |
| No oil | Clear | 1,090 | 1,060 | 920 | 580 | 370 |
| Diethylene glycol [2] di-neo-decanoate | do | 1,060 | 1,040 | 930 | 600 | 380 |
| Hexadecyl alcohol | Split into 2 layers | 900 | 850 | 650 | 350 | 340 |
| Isopropyl myristate | Clear | 1,000 | 970 | 720 | 470 | 360 |

[1] Foam height is given as the total volume of formulation and foam head in a one-liter graduated cylinder.
[2] Product mix contains: see Table III, item 5.

It is clear from the table that diethylene glycol di-neo-decanoate is far superior to the commercially available emollients in allowing foam formation and maintaining the foam for desired periods of time under static conditions. Furthermore, the foam height is equivalent to conditions under which no oil is present.

EXAMPLE 6

Emollients of the present invention were compared with other emollients in a modified test in which test solu- Aerosol formulation: Wt. percent
- Above concentrate _____ 96.0
- Isobutane propane (70/30) _____ 4.0

Results

Formulation A gave excellent foam stability with superior moisturizing properties.

Formulation B gave excellent foam stability with superior moisturizing properties.

Formulation C gave fair to poor foam stability and was very dry with no moisturizing properties.

This example shows that the ethylene glycol diester of neo-decanoic acid is also an excellent material for applications where foam stability is required.

EXAMPLE 8

Under conditions and with equipment as described in Example 1, stannous oxalate and sulfuric acid were compared as catalysts. Conversion and selectivity data are shown in Table IX. As can be seen, these catalysts are selective to the alkyl diester and ether alkyl diester, respectively. But regardless of the reaction product formed the conversion of the glycol monoester is uniformly excellent and the chief by-product for the selective reaction to the ethylene glycol diester is the diethylene glycol diester and the ethylene glycol diester is similarly the chief reaction product for the selective reaction to the diethylene glycol diester. Table X compares an ether alkyl diester with an alkyl diester under dynamic shampoo conditions, as defined in Example 6, and the results clearly show that the products are equally good in their lack of foam suppression activities. Thus, it is apparent that a suitable emollient may be the ether alkyl diester or the alkyl diester or mixtures thereof in any proportion, e.g., 1–99% of either, the remainder being the other diester.

TABLE IX

| Catalyst | Conversion | Product distribution (wt. percent) | | |
|---|---|---|---|---|
| | | Ethylene glycol diester | Diethylene glycol diester | Higher glycol diesters |
| Stannous oxalate | 98.0 | 87.0 | 10.2 | 0.8 |
| Sulfuric acid | 98.2 | 5.0 | 85.4 | 7.8 |

TABLE X

| | Dynamic shampoo conditions | | | | | | |
|---|---|---|---|---|---|---|---|
| | 1 min. | 5 min. | 10 min. | 15 min. | 20 min. | 30 min. | 40 min. |
| Diethylene glycol di-neo-decanoate (product mix—Table III, item 5) | 690 | 770 | 830 | 900 | 920 | 950 | 900 |
| Pure diethylene glycol di-neo-decanoate | 660 | 780 | 860 | 900 | 900 | 920 | 880 |
| Pure ethylene glycol di-neo-decanoate | 680 | 800 | 840 | 880 | 900 | 920 | 880 |

What is claimed is:

1. A process for preparing diesters which comprises contacting a hindered acid glycol monoester having the formula

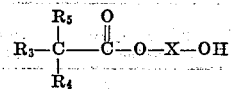

wherein $R_3$, $R_4$ and $R_5$ are each $C_1$–$C_{20}$ hydrocarbyl radicals and X is further defined as

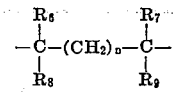

wherein $n$ is 0 to 8 and $R_6$, $R_7$, $R_8$ and $R_9$ are each selected from the group consisting of hydrogen, $C_1$–$C_6$ alkyl, and $C_6$ aryl, with an esterification catalyst at temperatures ranging from about 120–250° C. for a period of time sufficient to convert a portion of the glycol monoester to diesters, said diesters comprising as a major component diesters having the formula

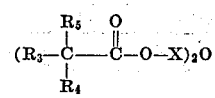

wherein $R_3$, $R_4$, $R_5$ and X are as previously defined.

2. The process of claim 1 wherein $R_3$ is a $C_5$–$C_{13}$ alkyl radical and $R_4$ and $R_5$ are each $C_1$–$C_4$ alkyl radicals.

3. The process of claim 2 wherein said esterification catalyst is a Bronsted acid.

4. The process of claim 1 wherein said esterification catalyst is an acidic type solid.

5. The process of claim 3 wherein said esterification catalyst is paratoluene sulfonic acid.

6. The process of claim 5 wherein $n$ is 0 and $R_6$, $R_7$, $R_8$ and $R_9$ are hydrogen.

References Cited

UNITED STATES PATENTS

| 3,102,128 | 8/1963 | Hennig et al. | 260—404.8 X |
| 2,720,507 | 10/1955 | Caldwell | 260—75 |
| 2,871,248 | 1/1959 | Kirkland et al. | 260—410.6 |
| 2,904,585 | 9/1959 | Doerr et al. | 260—410.6 |

FOREIGN PATENTS

| 673,082 | 6/1952 | Great Britain | 260—410.6 |
| 24,109 | 8/1935 | Australia | 260—410.6 |

OTHER REFERENCES

Billmeyer, Textbook of Polymer Science, 1962, pp. 293–4.

Margerison et al., An Introduction to Polymer Chemistry, 1967, pp. 119–21.

LORRAINE A. WEINBERGER, Primary Examiner

R. S. WEISSBERG, Assistant Examiner

U.S. Cl. X.R.

252—117; 260—468 R, 476 R, 488 CD, 488 J, 491; 424—365